United States Patent
Redmann

(10) Patent No.: US 10,051,115 B2
(45) Date of Patent: Aug. 14, 2018

(54) CALL INITIATION BY VOICE COMMAND

(71) Applicant: THOMSON LICENSING, Issy de Moulineaux (FR)

(72) Inventor: William Gibbens Redmann, Glendale, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 86 days.

(21) Appl. No.: 14/770,481

(22) PCT Filed: May 1, 2013

(86) PCT No.: PCT/US2013/039057
§ 371 (c)(1),
(2) Date: Aug. 26, 2015

(87) PCT Pub. No.: WO2014/178860
PCT Pub. Date: Nov. 6, 2014

(65) Prior Publication Data
US 2016/0044160 A1 Feb. 11, 2016

(51) Int. Cl.
*H04M 1/64* (2006.01)
*H04M 3/02* (2006.01)
(Continued)

(52) U.S. Cl.
CPC .......... *H04M 3/02* (2013.01); *H04L 65/1006* (2013.01); *H04M 3/42204* (2013.01);
(Continued)

(58) Field of Classification Search
CPC ....................................................... H04M 3/02
See application file for complete search history.

(56) References Cited

U.S. PATENT DOCUMENTS 5,999,611 A 12/1999 Tatchell et al.
6,161,087 A 12/2000 Wightman et al.
(Continued)

FOREIGN PATENT DOCUMENTS

WO WO9426054 11/1994
WO WO2011144617 11/2011

OTHER PUBLICATIONS

Fagin EtAl: "A Microcontroller-Based System for Intelligent Telephone"; IEEE Transactions on Consumer Electronics, col. 38, No. 4 900-5; Sep. 11, 1992.
(Continued)

*Primary Examiner* — Joseph T Phan
(74) *Attorney, Agent, or Firm* — Brian J. Dorini, Esq.; Robert D. Shedd, Esq.

(57) ABSTRACT

A terminal for use in a communications network for calling a called party includes a capture buffer for storing a media stream, including a voice command, received from the caller. A session controller in the terminal controls call handling and launches the call from the caller to the called party in accordance with the voice command. Responsive to the session manager, a stream controller will transmit the media stream from the capture buffer to the called party following set up of the call. In this way the called party may identify the caller voice and screen the call. Silence intervals in the media stream are detected and suppressed.

9 Claims, 9 Drawing Sheets

(51) Int. Cl.
  *H04M 3/42*   (2006.01)
  *H04M 3/436*  (2006.01)
  *H04L 29/06*  (2006.01)
  *H04M 7/00*   (2006.01)

(52) U.S. Cl.
  CPC ............ *H04M 3/436* (2013.01); *H04M 7/006* (2013.01); *H04M 2201/40* (2013.01); *H04M 2201/50* (2013.01)

(56) References Cited

U.S. PATENT DOCUMENTS

| | | | | |
|---|---|---|---|---|
| 7,720,091 B2* | 5/2010 | Faber | ................... | H04L 63/083 370/260 |
| 8,116,443 B1* | 2/2012 | Reese | ............... | H04M 3/42042 379/207.02 |
| 8,125,931 B2* | 2/2012 | Faber | ................ | H04L 29/06027 370/259 |
| 8,345,835 B1* | 1/2013 | Or-Bach | ............ | G06Q 30/0269 379/114.13 |
| 8,532,276 B2* | 9/2013 | Altberg | ................... | H04M 3/42 370/260 |
| 8,879,698 B1* | 11/2014 | Lavian | .................... | H04M 1/64 379/88.18 |
| 9,001,819 B1* | 4/2015 | Or-Bach | ............ | H04L 65/4015 370/352 |
| 9,247,470 B2* | 1/2016 | Jain | ....................... | H04W 36/14 |
| 2010/0010890 A1 | 1/2010 | Ditkovski et al. | | |
| 2010/0119046 A1* | 5/2010 | Hoblit | .................... | H04M 1/57 379/88.03 |
| 2011/0238414 A1* | 9/2011 | Ju | ......................... | H04M 1/505 704/201 |

OTHER PUBLICATIONS

Omoigui EtAl: "Time-Compression: Systems Concerns, Usage, and Benefits." CHI '99; Proceedings of SIGCHI Conference on Human Factors in Computing Systems, Microsoft Research, 1999.

* cited by examiner

Start-of-Call Commands

| Signal | Command | Suffix | Command Type | Command Form |
|---|---|---|---|---|
| 601 Computer: | Kirk to Bridge | | call initiation | <signal> {BUFFER} <self_ref> TO <station_ref> {INIT} |
| 602 | Kirk to Bridge | | call initiation | {BUFFER} <self_ref> TO <station_ref> {INIT} |
| 603 | Kirk to Scott | Meet me on the bridge. | | {BUFFER} <self_ref> TO <addressee_ref> {INIT} |
| 604 | Engineering, | I need more power! | call initiation | {BUFFER} <station_ref> {INIT} |
| 605 Computer: | Mr. Scott, | meet me on the bridge. | call initiation | <signal> {BUFFER} <addressee_ref> {INIT} |
| 606 | Mr. Scott, | meet me on the bridge. | call initiation | {BUFFER} <addressee_ref> {INIT} |
| 607 | Scott here, | Captain | call acceptance | {BUFFER} <self_ref> HERE {ACCEPT} |
| 608 | Here, | Sir. | call acceptance | {BUFFER} HERE|AYE|HELLO {ACCEPT} |
| 609 | Aye, | Scott here, Sir. | call acceptance | {BUFFER} <familiar_greeting> {ACCEPT} |
| 610 | Hey, | Captain | call acceptance | {BUFFER} <familiar_greeting> {ACCEPT} |
| 611 Computer: | Cancel | | call denial | <signal> CANCEL|BLOCK|DENY {DECLINE} |
| 612 | Cancel | | call denial | CANCEL|BLOCK|DENY {DECLINE} |
| 613 | <timeout> | | call denial | <timeout> {DECLINE} |
| 614 | <select callee> <facing camera> | Mark, you there? | call initiation | <select callee> <facing telepresence camera> {BUFFER} {INIT} |
| 615 | <facing camera> | What do you want? | call acceptance | <facing telepresence camera> {BUFFER} {ACCEPT} |

In-Call Commands

| Signal | Command | Suffix | Command Type | Command Form |
|---|---|---|---|---|
| 621 Computer: | Video on. | | video activation | {REDACT_S} <signal> VIDEO ON {REDACT_E} {VIDEO_ON} |
| 622 Computer: | Video on. | | video activation | {REDACT_S} VIDEO ON {REDACT_E} {VIDEO_ON} |
| 623 Computer: | Video off. | | video deactivation | {REDACT_S} <signal> VIDEO OFF {REDACT_E} {VIDEO_OFF} |
| 624 Computer: | Video off. | | video deactivation | {REDACT_S} <signal> VIDEO OFF {REDACT_E} {VIDEO_OFF} |
| 625 Computer: | Mute. | You can't hear me. | audio deactivation | {MUTE} <signal> MUTE |
| 626 Computer: | Unmute. | As I was saying... | audio activation | <signal> UNMUTE {UNMUTE} |
| 627 Computer: | Mute. | You can't hear me. | audio deactivation | {MUTE} MUTE |
| 628 Computer: | Unmute. | As I was saying... | audio activation | UNMUTE {UNMUTE} |
| 629 Computer: | Record This Call | | other command | {REDACT_S} <signal> <other commands> {REDACT_E} |
| 630 Computer: | Switch Calls | Scott here, Sir. | switch call | {MUTE} <signal> <switch command> {ACCEPT} {BUFFER} |
| 631 Computer: | Resume Call | Sorry about that. | resume call | {MUTE} <signal> <resume command> {RESUME} {BUFFER} {UNMUTE} |

CALL INITIATION BY VOICE COMMAND

This application is a National Stage Application and claims the benefit, under 35 U.S.C. § 365 of International Application PCT/US2013/039057 filed May 1, 2013 which was published in accordance with PCT Article 21(2) on Nov. 6, 2014 in English.

TECHNICAL FIELD

This invention relates to managing both audio-only and audio-video calls.

BACKGROUND ART

Presently, a caller seeking to establish an audio-only or audio-video call with one or more called parties does so through a series of steps, beginning with initiating the call. After initiating the call, call set-up occurs to establish a connection between the caller and the called party. Assuming the called party chooses to accept the call once set-up, the caller will then announce himself or herself to the called party. The advent of Caller Identification ("Caller ID) allows the called party to engage in "Call Screening," whereby a called party examines the caller ID (e.g., the telephone number of the called party) to decide whether to answer the call. If the called party has a call answering service, provided by either a stand-alone answering machine or a network service, the called party can forgo answering the call, thereby allowing the call answering machine or answering service to take a message. With many stand-alone answering machines, the called party can listen to the call as the answering machine answers the call. Before the answering machine records a message from the caller, the called party can interrupt the answering machine and accept the call. However, if the called party accepts the call once the answering machine has begun to record the caller's message, the answering machine will now record the conversation between the caller and called party.

Traditionally, a caller initiates a call by entering a sequence of Dual Tone Multi-Frequency (DTMF) signals representing the telephone number of the called party. The caller will enter the called party's telephone number through a key pad on the caller's communication device (e.g., a telephone) for transmission to a network to which the caller subscribes. Rather than enter a telephone number, the caller could enter another type of identifier, for example, the called party's name, IP address or URL, for example to enable the network to set-up (i.e., route) the call properly.

Many new communications devices, for example mobile telephones, now include voice recognition technology thereby allowing a caller to speak a command (e.g., "call John Smith") to initiate a call to that party. In response to the voice command, the communications device will first ascertain the telephone number or other associated identifier of the called party (e.g., IP address or URL) and then translate that identification of the called party into signaling information needed to launch the call into the communications network. Presently, the initial voice command made by the caller to launch the call typically never reaches the called party. Instead, the caller's communication device typically will discard the voice command during the process of translating the voice command into the signaling information necessary to initiate the call. At best, the called party will only receive the telephone number identifying the caller. In some instances, outbound calls from various individuals at a common location will have a single number associated with a trunk line carrying the call from that common location into the communications network. Under such circumstances, the called party will only receive the telephone number of the trunk line that carried the call and will not know the identity of the actual caller.

Thus, a need exists for a voice-activated call initiation technique that overcomes the aforementioned disadvantages.

BRIEF SUMMARY OF THE INVENTION

Briefly, in accordance with an illustrated embodiment of the present principles, a method for establishing a call from a caller to a called party commences by storing a media stream, including a voice command, received from the caller. Thereafter, the call is launched from the caller to the called party in accordance with the voice command. The media stream is transmitted to the called party following set up of the call.

BRIEF DESCRIPTION OF THE DRAWINGS

FIGS. 6A and 6B collectively present a table of exemplary commands suitable for use with the system of FIG. 1 to initiate and manage a call in accordance with the present principles, and, FIG. 7 depicts examples of utterance parsing that matches a voice command with the corresponding start point for a buffered stream.

DETAILED DESCRIPTION

Figure 1:
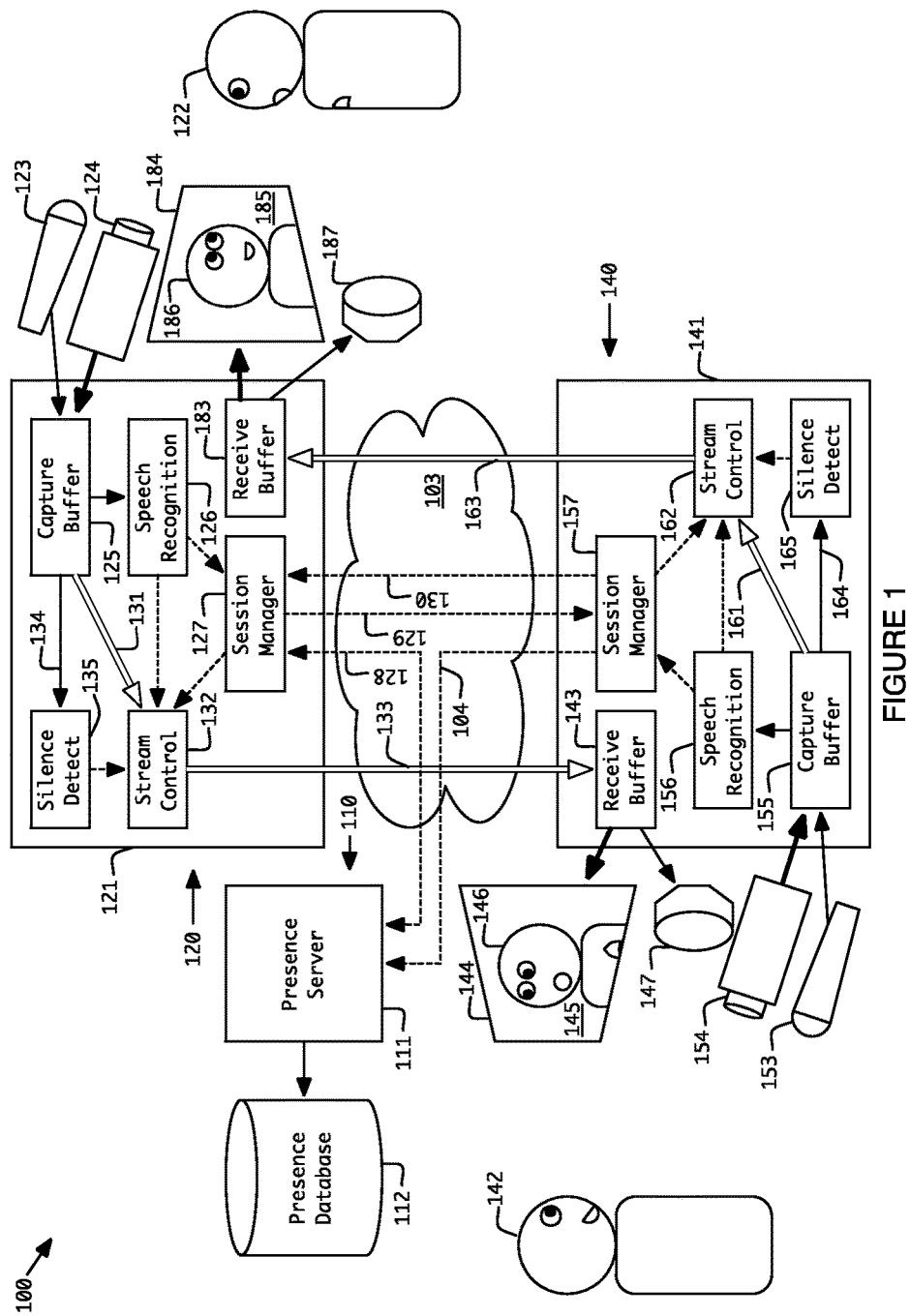
FIG. 1 depicts a block diagram of an exemplary communications system for establishing a call in accordance with the present principles.

FIG. 1 depicts a block schematic diagram of a communications system 100 useful for practicing the call establishment technique of the present principles. The system 100 comprises two stations 120 and 140 and a presence block 110 interconnected to each other via a communication channel 103, which could comprise a local area network (LAN), a wide area network, (WAN) or the Internet, or any combination of such networks. The presence block 110 comprises a presence server 111 that maintains and provides access to a presence information database 112 storing subscriber presence information. Such presence information indicates the status of subscribers in communication with the presence block 110, such as whether a subscriber is "on line" or "off-line." Presence servers exist in the art and typically find use in conjunction with instant messaging systems. The presence block 110 allows subscribers to register themselves as being online, along with other information, so that other subscribers can discover them upon accessing the presence server 111.

In the exemplary embodiment of FIG. 1, subscribers 122 and 142 employ stations 120 and 140, respectively to communicate with each other over the communications channel 103. The stations 120 and 140 generally have the same structure. In this regard, the stations 120 and 140 comprise terminals 121 and 141, respectively, which provide an interface for microphones 123 and 153, respectively, and audio reproduction devices 187 and 147, respectively. If the stations 120 and 140 have video as well audio capability, then the terminals 121 and 141 will also provide an interface to cameras 124 and 154, respectively, and monitors 184 and 144, respectively.

Understanding the flow of communications signals between the two stations 120 and 140 will aid in understanding of the operation of the communications system 100 of FIG. 1. At station 120, the camera 124 captures an image of the subscriber 122 and generates a video signal that varies accordingly, whereas the microphone 123 will capture that subscriber's voice and will generate an audio signal that varies accordingly. A capture buffer 125 in the terminal 121 buffers these video and audio signals until accessed as an audio/video media data 131 by a stream controller 132. The stream controller 132 transmits the audio/video media data as a media stream 133 to the station 140 over the communications channel 103, which may comprise the Internet, for receipt and decoding by a receive buffer 143 in the terminal 141. At the terminal 141, the receive buffer 143 will receive and decode the received media stream from the terminal 121. The receive buffer 143 provides the video portion of the media stream to a monitor 144 and provides the audio portion of the stream to an audio reproduction device 147. In this way, the monitor 144 will display a presentation 145 that includes an image 146 of the subscriber 122, whereas the audio reproduction device 147 will reproduce that subscriber's voice.

At the station 140, the camera 154 will capture the image of the subscriber 142 and generate a video signal that varies accordingly, whereas the microphone 153 at that station will capture that subscriber's voice and generate an audio signal that varies accordingly. A capture buffer 155 in the terminal 141 will buffer the video and audio signals from the camera 154 and the microphone 153, respectively, until accessed as audio/video media data 161 by a stream controller 162. The stream controller 162 in the terminal 141 will transmit the audio/video media data 161 as a media stream 163 to the station 120 via the communications network 103 for receipt at a receive buffer 183 in the terminal 121 at the station 120. Thereafter, receive buffer 183 will provide video portion of the media stream to a monitor 184 and the audio portion of the stream to an audio reproduction device 187. In this way, the monitor 184 will display a presentation 185 that includes an image 186 of the subscriber 142, whereas the audio reproduction device 187 will reproduce that subscriber's voice.

At the stations 120 and 140, session managers 127 and 157 in the terminals 121 and 141, respectively, provide the management functions necessary for handing calls. In some embodiments, each session manager could take the form of a module implementing the well-known Session Initiation Protocol (SIP), an Internet standard generally used in conjunction with Voice over Internet Protocol (VoIP) and suitable for this purpose, but also having the capability of managing calls with video. In other embodiments, different protocols suitable for the purpose may be substituted. The session managers 127 and 157 have the responsibility for setting up, initiating, managing, terminating, and tearing down the connections necessary for a call. In this embodiment, the session manager 127 and 157 typically communicate with the presence block 110 via connections 128 and 104 respectively, to register themselves or to find each other over the communication channel 103.

Control of the session managers 127 and 157 can occur in several different ways. For example, the session managers 127 and 157 could receive control commands from subscribers 122 and 142, respectively, through a graphical subscriber interface (not shown). Further, the session managers 127 and 157 of FIG. 1 could receive spoken control commands recognized by speech recognition modules 126 and 156, respectively, at the terminal 121 and 141, respectively. In addition to, or in place these control mechanisms, control of the session managers 127 and 157 could occur via by gestures detected by the cameras 124 and 154, respectively, and recognized by corresponding gesture recognition modules (not shown).

The session managers 127 and 157 can provide control signals to the stream controllers 132 and 162, respectively, in a well-known manner. In this way, once a station has initiated a call using SIP and the other station has accepted the call, also using SIP, then the session managers can establish the separate connections between the stations via the stream controllers to transport corresponding media streams 133 and 163 between stations. In some embodiments, well-known protocols exist that are suitable for these connections to carry the media streams 133 and 163, including the Real-time Transport Protocol (RTP) and the corresponding RTP Control Protocol (RTCP), both Internet standards. Other embodiments may use different protocols.

In some cases, the media streams 133 and 163 can include spoken or gesture-based commands sent from one station to the other station. In other instances, transmitting such commands will prove undesirable. In accordance with the present principles, the command recognition components (e.g., the speech recognition modules 126 and 156 as shown, as well the gesture recognition module (not shown)) will provide a control signal to their respective stream controllers 132 and 162. These control signals indicate which portions of the audio/visual media data 131 and 161 should undergo streaming and which parts that should not.

Providing specific control signals from the command recognition components (e.g., the speech recognition modules 126 and 156) to the stream controllers 132 and 162 can give rise to a substantial delay (e.g., on the order of several seconds) between the capture of the audio/visual signals in the buffers 125 and 155 and actual access of the audio/visual media data 131 and 161 by stream controllers 132 and 162, for transmission as the media streams 133 and 163, all respectively. A much shorter delay (e.g., on the order of less than 100 mS) will greatly enhance communication between the subscribers 122 and 142. In accordance with the present principles, the stream controllers 132 and 162 (or other component within each corresponding terminal), keep track of the current delay imposed by the corresponding capture buffers 125 and 155, respectively. The terminals 121 and 141 reduce this current delay (to reach a predetermined minimum delay, which may be substantially zero) by reading the corresponding audio/visual media data 131 and 161, respectively, at a faster-than-real-time rate with stream controls 132 and 162 to provide, for an interval of time, time-compressed media streams 133 and 163, respectively. Reading the corresponding audio/visual media data 131 and 161, respectively, at a faster-than-real-time rate provides a somewhat faster-than-real-time representation of data from capture buffers 125 and 155, respectively.

In some embodiments, the stream controllers 132 and 162 can also serve to reduce the current delay when it exceeds a predetermined minimum delay by making use of information collected from silence detectors 135 and 165. Each of the silence detectors 135 and 165 previews data in a corresponding one of the capture buffers 125 and 155, respectively, by reading ahead of the audio/video media data 131 and 161, respectively, and identifying intervals within the buffered data where the corresponding one of the subscribers 122 and 142 appears not to speak. Playing a portion of the media stream at faster-than-real-time appears much less noticeable to the remote subscriber while the local subscriber remains silent, especially if the corresponding stream controller offers no pitch compensation while streaming audio at faster-than-real-time. In embodiments where the stream controller (or receive buffer) does offer pitch compensation when audio streams out at faster-than-real-time, a remote subscriber will perceive the local subscriber as speaking somewhat quickly, but without suffering from "chipmunk effect" (that is, an artificially high-pitched voice).

Figure 2:
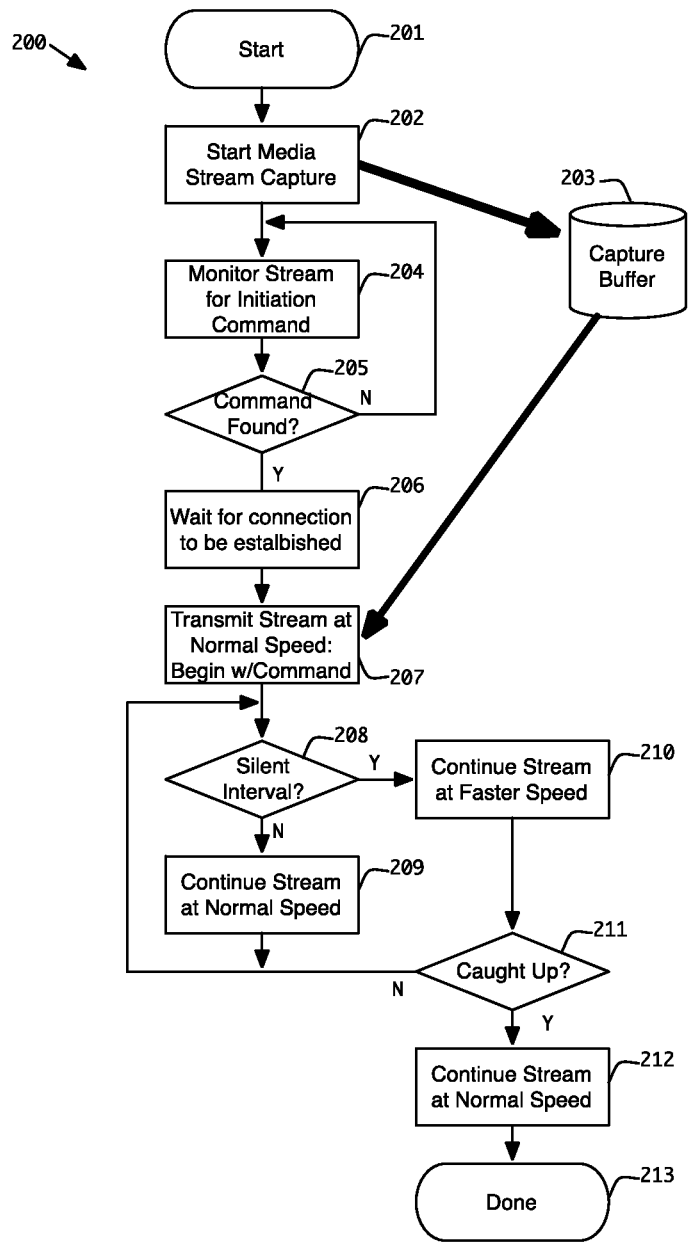
FIG. 2 depicts, in flow chart form, the steps of an exemplary process executed by the system of FIG. 1 to provide improved call initiation, for use by the caller, called party or both.

FIG. 2 depicts, in flow chart form, the steps of an exemplary call initiation process 200 executed by the system of FIG. 1 to provide improved call initiation, for use by the caller, called party or both. In particular, the call initiation process 200 can undergo execution by a corresponding one of the terminals 121 and 141 of FIG. 1 when a caller places a call or when the called party accepts that call, respectively. The call initiation process 200 begins upon execution of step 201, at which time a terminal (e.g., terminal 121) receives an audio signal from the microphone 123, and perhaps a video signal from the camera 124. No connection yet exists with any remote terminal (e.g., terminal 141), but where necessary, one or both terminals have already registered with the presence block 110. In some embodiments, the process 200 may begin following a specific stimulus (e.g., a button press on a remote control, not shown, or receipt of a SIP "INVITE" message, that is, a message in SIP proposing a call from a remote terminal). In other embodiments, the process 200 may run continuously, always awaiting a verbal command (or a command gesture).

During step 202, audio will begin to accumulate in the capture buffer of the terminal (depicted generically in FIG. 2 as buffer 203, which corresponds a corresponding one the buffers 125 and 155 in terminals 121 and 141, respectively, during the interval which that capture buffer stores incoming information). While audio continues to accumulate in buffer 203, the terminal will monitor the media stream (in this example, more specifically, the audio stream) for an initiation command during step 204. In other words, the terminal will await a command from the subscriber to place a new call or accept an incoming call. Typically, the speech recognition module 126 at the terminal will undertake such monitoring. Initiation commands can have different forms, as discussed in greater below in conjunction with FIG. 6A, but should be generally intuitive for the subscriber. During step 205, the terminal will detect whether the subscriber has entered an initiation command. In the case of a terminal that supports gestural commands, the terminal will monitor the video signal generated by the local camera for a gesture corresponding to an initiation command. Gestural commands may be used instead of or in addition to verbal commands. An example of a combined use would be if verbal commands were only accepted if the subscriber were determined to be facing the video camera 124.

If during step 205, the terminal does not detect an initiation command, the process 200 reverts to step 204 during which the terminal continues to monitor for an initiation command. When the terminal detects an initiation command during step 205, then during step 206, the session manager at the terminal is given a notification to initiate a connection (i.e., place a call, or accept an incoming call) and the process 200 waits for notification that the session manager has completed the call connection. The detected initiation command may contain parameters, for example, who or what other station to call. Under such circumstances, the terminal will supply such parameters to the presence block 110 in order to resolve to the address of a remote terminal. Alternatively, the terminal itself could resolve the address of a remote terminal using local data, for example, a locally maintained address book (not shown). The initiation command could contain other parameters, for example, the beginning point in the capture buffer 203 for a subsequent media stream (e.g., stream 133). The grammar for individual commands, discussed below in conjunction with FIGS. 6A, 6B, and 7 will identify such parameters.

Upon establishment of a connection, the stream controller (e.g., 132) will receive a command to begin sending a media stream (e.g., media stream 133) during step 207, here at normal speed, beginning in the capture buffer at a point indicated by initiation command detected during step 205. While the stream controller (e.g., the stream controller 132 in the terminal 121) transmits the media stream (e.g., the media stream 133) at normal speed, a check occurs during step 208 to detect a silent interval. If the current position in audio/video media data (e.g., the data 131) does not correspond to a silent interval (e.g., as detected and noted by the silence detector 135), then during step 209, the stream controller will continue to provide the media stream at normal speed. However, upon detection of a substantially silent interval (e.g., an interval during which the subscriber 122 does not speak), then during step 210, the stream controller will play out the media stream at faster-than-real-time.

A speed of 1⅓ faster-than-real-time generally achieves a sufficient speed-up during step 210 and at other times, though a greater or lesser speedup could occur for aesthetic reasons. If the delays accumulated in capture buffer 203 of FIG. 2 exceed the amount of time necessary to connect a call by a large amount because of the length or number of parameters or other complexities in the command structure, then a faster speed-up may be used as an aesthetic matter. Delays may also grow larger or smaller with the use of certain spoken languages having longer or shorter words.

In the course of answering a call, the capture buffer 203 will typically accumulate less delay than for placing a call, since the command for answering a call typically has a more simple structure. At the same time, the protocol exchange and delay in opening a media stream (e.g., stream 163) after accepting a call remains shorter, whereby the accumulated delay becomes ratiometrically larger by comparison to setting up the media stream than the delay accumulated when placing the call. (On the other hand, when a called party takes a long time to accept a call, then the accumulated delay at the call-initiator's buffer will grow much larger.)

In some embodiments, during step 210, all or a portion of the silent interval detected during step 208 may get skipped, though this may result in a discontinuity in the resulting media stream (i.e., a 'pop' in the audio or a 'skip' in the video). The use of well-known audio and video techniques (e.g., fade-out, fade-in, crossfade, etc.) can at least partially address such discontinuities. During step 211, while play out proceeds at faster-than-real-time during the silent interval (or in alternative embodiments, skipping occurs), the terminal makes a determination whether the stream controller has "caught up" to the capture buffer, that is, whether the accumulated delay between the play out point for audio/video media data and the current capture point for live audio and video from microphone and camera has decreased to equal or become less than a predetermined value.

Determination of the predetermined value during step 211 will depend on the type of call (e.g., with or without video) and may depend on the hardware implementation. Often, transfer of the audio and video signals to the capture buffer at a given terminal occurs in blocks (e.g., 10 mS blocks for audio or frames of video every ⅓₀ second), as frequently seen with Universal Serial Bus (USB) computer peripherals and many other interfaces. Likewise, the stream controller at the terminal will access the audio/video media data in the same or different sized blocks. Because such accesses typically occur in quantized units (e.g., by the block or by the frame), and may occur asynchronously, the term 'substantially' is used in this context. For example, the "predetermined value" used for comparison against the accumulated delay could comprise a maximum buffer vale of not more than 2 frames of video, or in an audio-only embodiment, not more than 50 mS of buffered audio. This predetermined value should not exceed 250 Ms.

As long as the determination made during step 211 finds that the stream controller at the given terminal has not caught up and has not sufficiently reduced the accumulated delay, the process 200 of FIG. 2 returns to step 208. During that step, the terminal determines whether the silent interval has elapsed to avoid encountering media wherein subscriber speaks while still at faster-than-real-time speed. While the silent interval continues, or when a new one appears, the stream controller will access audio/video media data during step 210 at the faster-than-real-time rate until a determination occurs during step 211 that the accumulated delay has been sufficiently consumed. Once caught up at step 212, the stream controller plays out the media stream at normal speed and the call initiation process 200 ends at step 213.

Figure 3A:
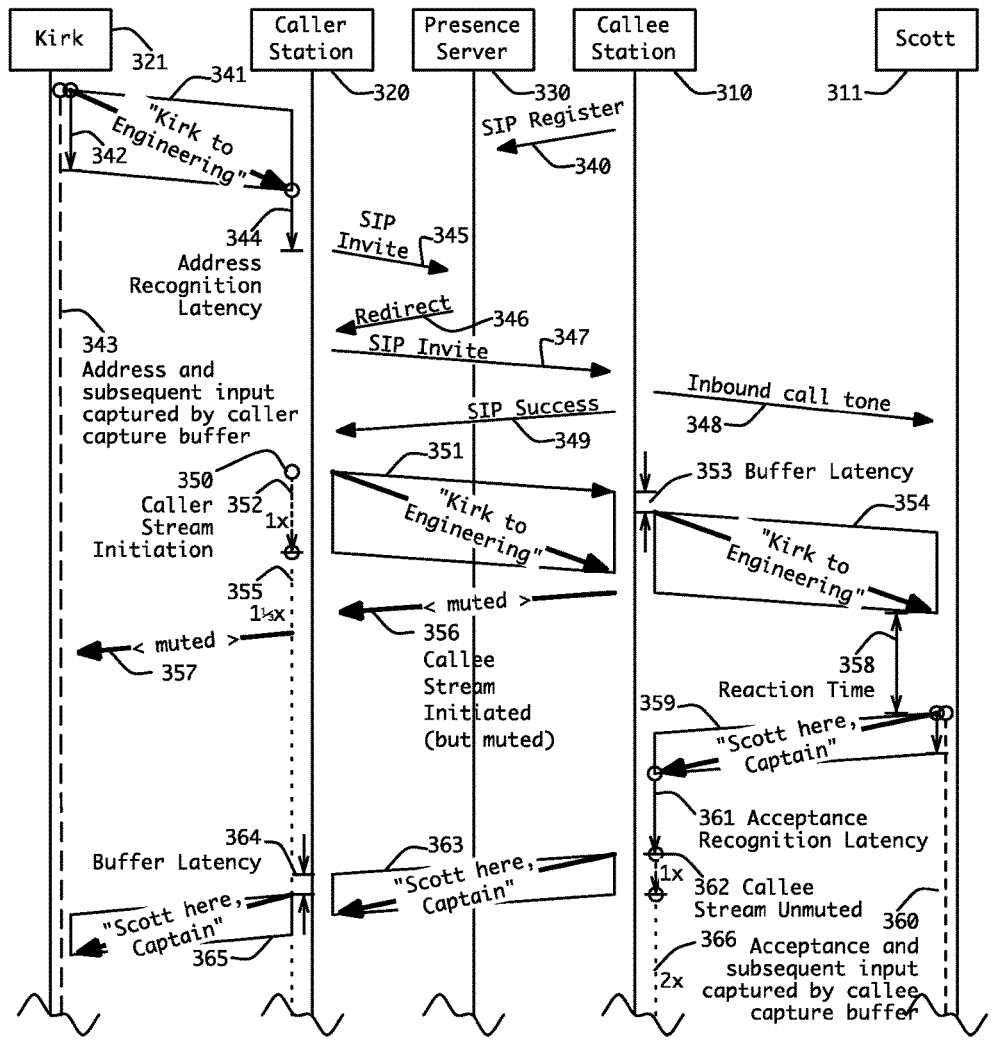
FIGS. 3A and 3B, when viewed together, depict a transaction diagram illustrating the transactions between two stations of the communications system of FIG. 1, each implementing the exemplary call initiation process of FIG. 2.
Figure 3B:
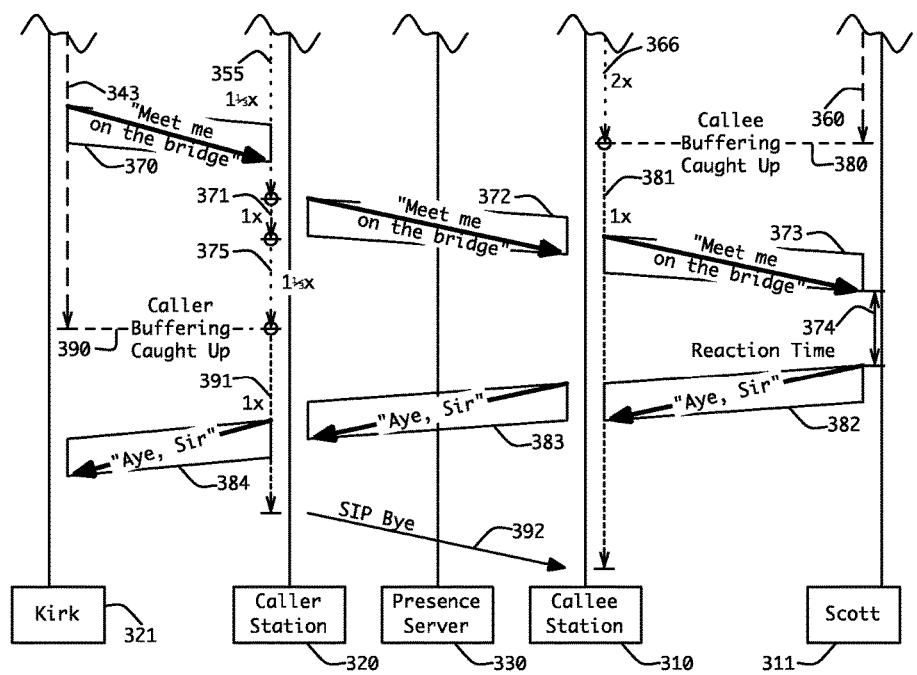

The discussion of the call initiation process 200 of FIG. 2 has focused largely on the terminal 121, and particularly, upon the subscriber 122 using that terminal to initiate a call. The call initiation process 200 can also find application in connection with the acceptance of an inbound call at a terminal, e.g., terminal 141 of FIG. 1. The transaction diagrams illustrated in FIGS. 3A and 3B represent, in combination, execution of the call initiation process 200 of FIG. 2 by each of the terminals 121 and 141 of FIG. 1, independently. In this case, the terminal 121 executes the call initiation process 200 to place a call while the terminal 141 executes the process to answer the call.

The transactions illustrated in FIGS. 3A and 3B occur among five entities: the subscribers 122 and 142, their corresponding terminals 121 and 141, respectively, and the presence block 100. Each entity appears in the transaction diagram as a vertical line, as time proceeds from the top of FIG. 3A downward to the bottom of FIG. 3B. Squiggly lines show the breaks, where the vertical lines of FIG. 3A mate with those of FIG. 3B to form a continuous transaction timeline. The vertical scale represents time generally, but not to any particular scale or duration.

Starting at the top of FIG. 3A, the left vertical line 321, labeled "Kirk" represents the name of the subscriber 122 depicted in FIG. 3A and indicates that this subscriber has started to place a call. Kirk's station (e.g., station 120) corresponds to the vertical line 320, and hereinafter, the reference number 320 will bear the designation as the calling party's station. For ease of discussion, other subscriber (e.g., subscriber 142) bears the name "Scott", as represented in FIGS. 3A and 3B by the vertical line 311 The vertical line 310 corresponds to the station 140 (e.g., "Scott's station") designated as the called party's station. The middle vertical line 330 represents the presence block 110, and hereinafter bears the designation "Presence Service".

At some point prior to call initiation, at least the called party's station 310 will register with the presence service 330, for example by using a 'REGISTER' message 340 in accordance with the SIP protocol discussed previously, so that callers can find the station 310 using the information registered with the presence service. In some cases, the station 310 can register with the presence service 330 under at least one particular name for that station, while in other cases; the station 310 will have a registration associated with at least one particular subscriber (e.g., Scott 311). The presence service 330 will accept the registration for station 310 and will make that registration information available to assist in call routing and initiation. In connection with system 100 of FIG. 1, the session manager 157 may send the "REGISTER" message to the presence server 111 via a connection 104 either upon startup, or when subscriber 142 logs in. In this example, terminal 141 registers the identity of its station 140 as "Engineering" and calls to "Engineering" are redirected to this terminal.

Referring to FIG. 3A, the caller's station 320 starts an instance of call initiation process 200 of FIG. 2, which may run continuously, or may start in response to a button (not shown) being pressed, or upon opening of a cover (not shown) on the microphone 123 of FIG. 1. To initiate a call, the subscriber Kirk 321 makes the verbal utterance 341, "Kirk to Engineering." Since station 320 runs the call initiation process 200, the capture buffer 203 of FIG. 2 (corresponding to the capture buffer 125 in the terminal 121 of FIG. 1) now captures the media stream (as discussed in connection with the step 202 of FIG. 2). The utterance 341 of FIG. 3A has duration 342. The speech recognition module 126 of FIG. 1 operates on this buffered utterance and will recognize a command to initiate a call after an address recognition latency 344.

So far, the capture buffer 125 of the terminal 121 of FIG. 1 has captured at least as much audio (and video) (in terms of the length of such information) as the sum of durations 342 and 344 of FIG. 3, and continues to do so. The terminal 121 of FIG. 1 typically manages its capture buffer 125 so the capture buffer does not keep more than several seconds of captured media absent detection of an intervening command. However, once the terminal 121 detects a command, buffering should continue in accordance with the current transaction. For the purpose of clarity, the transaction is presumed to conclude (successfully or otherwise) before reaching the physical limits of the capture buffer.

Upon recognizing the utterance 341 "Kirk to Engineering" as a command to initiate a call to a particular station or person, the station 320 sends an SIP "INVITE" message 345 for "Engineering" to the presence service 330 to identify the station associated with the label "Engineering." Referring to In FIG. 1, the session manager 127 would carry out this step by sending the SIP "INVITE" message 345 to the server 111 via connection 128. Following receipt of the "INVITE" message, the presence service 330 replies to the station 320 with an SIP "REDIRECT" message 346, because station 310 has previously registered as "Engineering" (with the message 340). In turn, station 320 repeats the SIP "INVITE" message 347, this time directed to the station 310, in accordance with the information supplied in the "REDIRECT" message 346.

Upon receiving SIP "INVITE" message 347, the station 310 now becomes aware of the call initiated by the subscriber Kirk 321. In some embodiments, the station 310 can provide a notification tone 348 the subscriber Scott 311. The called party station 310 responds to the "INVITE" message 347 with an SIP "SUCCESS" response code which (along with other well-known SIP transaction steps) allows caller station 320 to initiate a media stream at event 350 and begin transferring the buffered media.

Beginning at event 350, the capture buffer will begin transferring the captured version of utterance 341 as stream portion 351 during the interval 352. The utterance undergoes play out in real-time for interval 352, though delayed by a total amount of time from the start of the interval 342 to the start of the media stream at 350. This amount represents the cumulative delay in the capture buffer for the utterance 341. This delay arises from a combination of the utterance duration 342, the address recognition latency 344, and the cumulative latency from the sending of initial invitation message 345 to the receipt of the success response 349, plus some non-zero processing time (not explicitly identified).

Upon receipt of the early portion of the utterance in the early part of stream portion 351 at the called party station 310, some non-zero buffer latency 353 will occur as the receive buffer 143 at the terminal 141 of the called party station captures and decodes the utterance.

After decoding, which need not wait for the entire utterance to be received, the stream undergoes playback 354 to the subscriber Scott 311 via the audio reproduction device 147 of FIG. 1. In embodiments with video capability, the image captured by camera 124 of FIG. 1 will accompany the utterance of 341 of FIG. 3 in which case the media streams 351/133 will include such an image for display on the monitor 144 in synchronism with the playback 354.

If the capture buffer 155 in terminal 141 (corresponding to the called party station 310 of FIG. 3) has not already begun capturing sound from the microphone 153 and video from camera 154, both of FIG. 1, the buffer may begin to do so upon receipt at the terminal 141 of the "INVITE" message 347 or when triggered by the beginning of media stream 351. In either case, corresponding to step 202 in a separate instance of process 200 being performed by the called station 310. Immediately after making the utterance 341, the subscriber Kirk 321 may become substantially silent. However, such silence still constitutes an input signal (which may include video) captured in the capture buffer in the terminal available for streaming as the portion of buffered content 343 immediately following receipt of the utterance 341. This buffered content 343 serves as the audio/video data 131. While the buffered content will actually undergo capture in advance of the utterance 341, the speech recognition module 126 can still identify the call initiation command and address represented by utterance 341 and set the start of the buffered content to the location in the buffer 125 where the data representing utterance 341 begins.

However, in the illustrated embodiment of FIG. 1, the silence detector 135 will identify the interval immediately following utterance 341 as an interval of silence. After the interval 352 corresponding to the delayed but real-time (normal speed) streaming of the utterance 341, the subsequent interval 355 corresponding to the silence following the utterance can undergo play back at a faster-than-real-time rate (here, 1⅓ times faster-than-real-time. As the media stream continues to play back at a faster-than-real-time speed after interval 352, the accumulated delay in the stream will gradually reduce. Note that while the audio remains substantially silent and may not give any clue to the faster-than-real-time playback, any video present in the media stream 133 will also undergo playback at faster-than-real-time. This accelerated playback of video may produce noticeable, primarily aesthetic, effects.

Any time following the SIP "Success" response 349, the called party station 310 may begin play out of the called party media stream 163, shown here as beginning at event 356. However, since the subscriber Scott 311 has not accepted the call, the called party media stream initially remains muted. Initiating the called party stream before subscriber Scott 311 has personally accepted the call serves to minimize latency due to setting up the stream when and if the subscriber Scott 311 does eventually accept the call. The video corresponding to the called party media stream, muted while awaiting call acceptance, may appear black, or could include a video graphic (not shown) indicative of the called party station 310, or subscriber 311, depending on the configuration. The called party stream 163 in its muted condition may still undergo play out to the subscriber 321 as a video output 357 on the monitor 184 of FIG. 1, and an audio output reproduced by the audio reproduction device 187 of FIG. 1

As called party station reproduces the utterance 341 as the output 354, the subscriber Scott 311 will hears and/or see the communication from the subscriber Kirk 321. After a short reaction time 358, the subscriber Scott 311 replies with an utterance 359. Since capture buffer 155 has already become operational, the speech recognition module 156 of FIG. 1 can access the captured version of the utterance 359. After a recognition latency 361, the speech recognition module 156 will recognize the acceptance of the communication from the subscriber Kirk 321 by the subscriber Scott 311. The speech recognition module 156 will provides stream controller 162 in the terminal 141 with an offset into capture buffer 155 corresponding to the beginning of utterance 359. Thus, at 362, when called party stream controller 162 unmutes, the next portion 363 of the called party media stream corresponds to the response 359 by subscriber Scott 311.

Immediately after the utterance 359, the subscriber Scott 311 may become substantially silent. However, as discussed above, such silence still represents an input signal (which may include video) captured in the buffer 155 of the terminal 141 of FIG. 1. This silence remains available for streaming as a portion of the buffered content 360 immediately following the utterance 359. The stream controller 162 of FIG. 1 can access this buffered content 360 as the audio/video data 161. While the buffer 155 may actually capture this content in advance of utterance 359, the speech recognition module 156 can identify the acceptance command and set the start of the buffered content to the location in the buffer 155 where the data representing utterance 359 begins.

As the receive buffer 143 of FIG. 1 at called party station 310 of FIG. 3 has an intrinsic buffering and decode latency 353, so does receiver buffer 183 of FIG. 1 at caller station 320 have an intrinsic buffering and decode latency 364. Thus, following the muted media stream that started to play out to the subscriber Kirk 321 beginning at the event 357, the reproduction 365 of the utterance 359 in the now unmuted stream begins to play out. As the called party stream unmutes at event 362, the stream controller 162 of FIG. 1 will access the audio/video data 161 of FIG. 1 output from the capture buffer 155 of FIG. 1 at normal speed (i.e., real-time or "1×" speed). Subsequent to the utterance 359, the subscriber Scott 311 remains substantially silent, and the silence detector 165, in looking ahead at the audio/video media data 161 in the capture buffer 155 of FIG. 1, will detect this silence interval. Thus, following the streaming of audio/video media data 161 representing the utterance 359 in real-time immediately following the unmute event 362, the stream control can begin to playback at the start of the silent interval at faster-than-real-time speed for playback interval 366 (here, at double speed, or "2×" speed).

At this point, when the subscriber Kirk 321 says, "Kirk to Engineering" 341, the subscriber Scott 311 will hear this utterance in the form of the output 354 about five seconds later. The subscriber Scott 311 will typically respond with the utterance "Scott here, Captain," which the subscriber Kirk 321 will hear as the output 365 about ten seconds after his own original utterance 341. While these latencies appear high and perceptibly much larger than an in-person experience, each of stations 310 and 320 actively works to reduce their respective contributions to the overall latency as the call proceeds. The transaction continues in FIG. 3B.

Referring to FIG. 3B, the vertical lines corresponding to the subscriber Kirk 321, the caller station 320, the presence service 330, the called party station 310, and the subscriber Scott 311 continue from FIG. 3A. The buffers 125 and 155 in the terminals 121 and 141, respectively, capture the subsequent, continued inputs 343 and 360, respectively from the subscriber Kirk 321 and the subscriber Scott 311, respectively, as depicted at the top of FIG. 3B. Likewise, the faster-than-real-time playbacks 355 and 366, respectively, of the corresponding streams also continue. At event 380, the faster-than-real-time playback 366 of the buffered input 360 becomes caught up and subsequent playback 381 continues in real-time (i.e., at 1× normal speed) with substantially only a packet delay in the buffer 155 and the encoding by the stream controller 162 as sources of latency at station 141, which collectively amount to 10-50 mS.

Upon hearing the subscriber Scott's acknowledgement 365 (FIG. 3A), the subscriber Kirk 321 will reply with the utterance 370 "Meet me on the bridge". As the media stream 133 has not yet caught up to the input captured by the buffer 125, both of FIG. 1, a delay will exist before this utterance appears in the media stream 133. As the audio/video media data 131 provided for stream controller 132 approaches this utterance by the subscriber Kirk 321, the silence detector 135 will detect that that Kirk has begun speaking. Thus, playback 372 of this utterance will occur at normal playback speed (1x playback), still delayed, but otherwise in real-time as depicted by the playback interval 371. The terminal 141 of FIG. 1 receives the streamed playback 372 for receipt in the receive buffer 143 and substantially immediate output 373 (with only a buffering latency like 353), which the subscriber Scott 311 will hear, and if with video, see as well.

After the normal-speed interval 371, the silence detector 135 of FIG. 1 will again identify an interval during which the subscriber Kirk 321 remains substantially silent. Upon detecting such silence, the silence detector 135 will signal the stream controller 132 of FIG. 1 to resume faster-than-real-time playback (1⅓×) for the interval 375. At event 390, the faster-than-real-time playback has caught up with the input accumulated in capture buffer 125 of the terminal 121 (as detected at step 211), and subsequent playback 391 occurs in real-time (i.e., at normal, 1× speed).

In response to hearing subscriber Kirk's order 373, after a reaction time 374, the subscriber Scott 311 replies with the utterance 382 of acknowledgement "Aye, Sir". The faster-than-real-time play out has now consumed the accumulated delay in the capture buffer 125 of FIG. 1 so streaming of the audio/video media data 131 occurs only with latencies due to the need for packet buffering and encoding. Now, the propagation of the utterance 383 into the stream 133 of FIG. 1 will occur with only a minimal delay (e.g., less than about 50 mS). The actual value will depend mostly on the specific peripheral interfaces for input signals from the microphone 123 and the camera 124 (both of FIG. 1) and the window size for the encoder in stream controller 132 of FIG. 1). As a result, when the subscriber Kirk 321 hears the playback 384 of the acknowledgement by the subscriber Scott 311, the round trip latency between the utterance 370 and the acknowledgement 384 becomes substantially smaller than the original round trip latency between the utterance 341 and the acknowledgement 365. Further, since as of the event 390, neither of the capture buffers 125 and 155 has any accumulated delay, all subsequent interactions between the subscriber Kirk 321 and the subscriber Scott 311 during this call will have the same latency as a conventional call. After receiving the acknowledgement 384, the subscriber Kirk 321 will terminate the call (e.g., by button press, closing of a cover on microphone 153, gesture, or verbal command, none of which are shown), causing caller station 320 to send a SIP "Bye" message 392 to the called party station 310 to commence disconnection of the call in a well-known manner.

In the above described exemplary embodiment, the faster-than-real-time speeds of 1⅓× and 2× represent example values and serve as teaching example. Higher or lower speed-up values remain possible, including skips as previously discussed. Additionally, transitions between playback speeds are shown in FIGS. 3A and 3B as instantaneous, but could be gradual.

As discussed above, the silence detectors 135 and 165 of FIG. 1 trigger the stream controllers 132 and 162, respectively, to play captured media data at faster-than-real-time only while the local subscriber remains silent. However, other approaches exist for achieving faster-than-normal playback, thus obviating the need for the silence detectors 135 and 165. For example, whether the capture buffer has accumulated a any delay could constitute the determining factor for deciding whether to commence faster-than-real-time playback. Using this approach, the original utterances 341 and 359 of the subscribers Kirk 321 and Scott 311 would undergo playback at a faster-than-real-time speed, which may involve pitch shifting to avoid raising the pitch of the subscribers' voices. Other things being equal, this could result in the caller buffering catch-up event 390 occurring sooner in the overall transaction (likewise, called party buffering catch-up event 380 would occur sooner).

Figure 4:
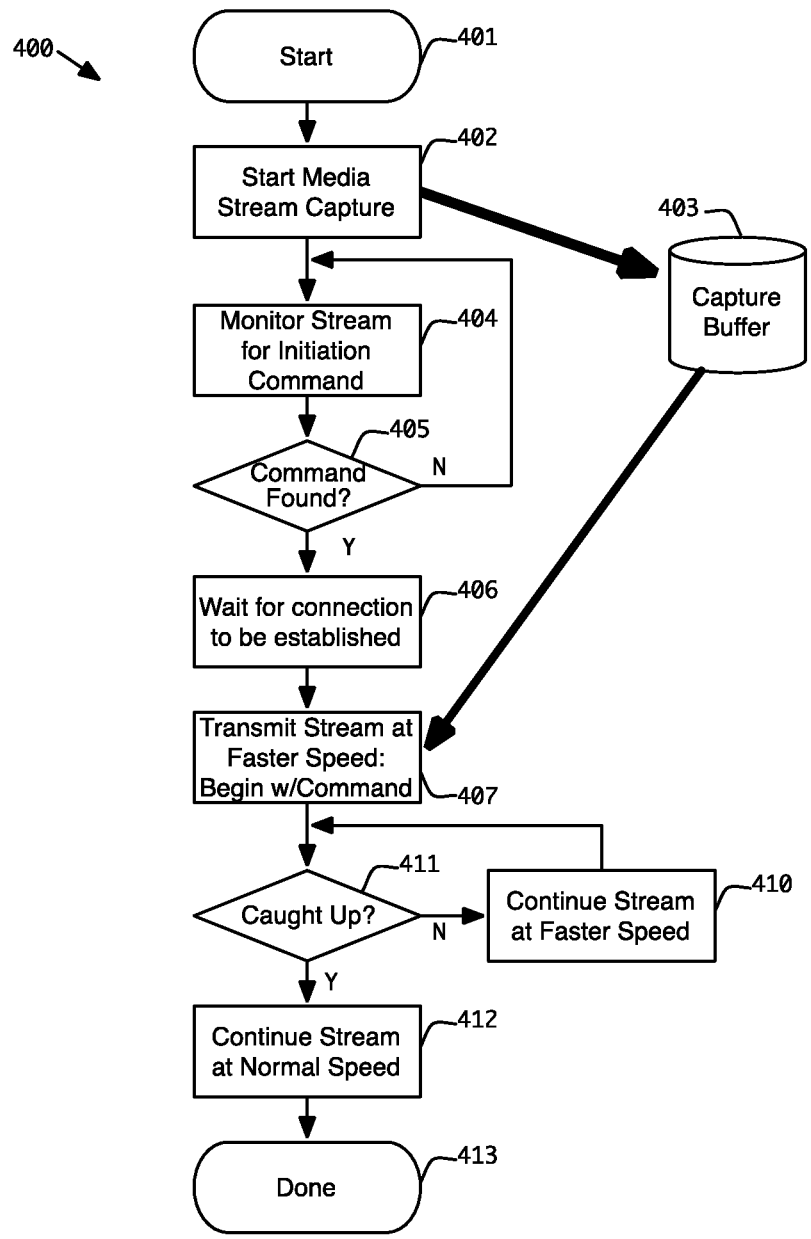
FIG. 4 depicts, in flowchart form, the steps of a second exemplary process executed by the system of FIG. 1 to provide improved call initiation, for use by the caller, called party or both.

FIG. 4 shows a flowchart for a process 400 for initiating a call in accordance with the present principles that does not require the use of a silence detector (such as the silence detectors 135 and 165 of FIG. 1) to identify substantially silent intervals. The caller terminal (e.g., the terminal 121 of FIG. 1) can use the stream initiation process 400 when placing a call. Likewise, the called party terminal (e.g., the terminal 141 of FIG. 1) can use the stream initiation process 400 when accepting a call. The stream initiation process 400 begins during step 401 of FIG. 4, whereupon a terminal (e.g., the terminal 121) receives an audio signal from the microphone 123 of FIG. 1, and a video signal from the camera 124 (when present). No connection yet exists with a remote terminal (e.g., the terminal 141 of FIG. 1), but where necessary, one or both terminals have registered with presence block 110. In some embodiments, process 400 could begin following a specific stimulus (e.g., a button press on a remote control, (not shown), or receipt of a SIP "INVITE" message proposing a call from a remote terminal). In other embodiments, process 400 may run continuously, always awaiting a verbal command or command gesture.

During step 402, at least audio begins to accumulate in the capture buffer 403, which generically represents the corresponding one of the capture buffers 125 and 155 of FIG. 1 during the interval which that capture buffer stores incoming information). While audio continues to accumulate in buffer 403, during step 404 monitoring of the audio stream occurs (typically by speech recognition module 126 of FIG. 1) for an initiation command, that is, a command for the terminal to place a new call or accept an incoming call. Initiation commands can take varying forms, as discussed below, but should be generally intuitive for the subscriber. During step 405, the terminal detects whether it has received an initiation command. In the case of a terminal that supports gestural commands, the initiation command could appear in the video signal received from the associated local camera (e.g., the camera 124 of FIG. 1), in place of (or in addition to) the audio signal from the microphone (e.g., the microphone 123 of FIG. 1) being monitored for commands.

If during step 405, the terminal does not detect an initiation command, the process 400 reverts back to step 404 to resume monitoring for such a command. However, if during step 405, the terminal detects an initiation command, then, during step 406, the session manager at the terminal (e.g., the session manager 127 at the terminal 121 of FIG. 1) is given a notification to initiate a connection (i.e., place a call, or accept an incoming call) and the process waits for notification that the session manager has established such a connection.

In the case of placing a call, the detected initiation command may contain parameters, for example, who or what other station to call. The terminal could supply such parameters to the presence block 110 to resolve the address of a remote terminal (e.g., terminal 141). Alternatively, the local terminal (e.g., the terminal 121 of FIG. 1) could resolve such parameters using local data (not shown, but for example a locally maintained address book). The initiation command could contain other parameters, for example, the beginning point in the capture buffer 403 for a subsequent media stream (e.g., stream 133). The grammar for individual commands, discussed below in conjunction with FIGS. 6A, 6B, and 7 will identify such parameters.

During step 407, upon the connection (e.g., for media stream 133) being established, the stream controller (e.g., the stream controller 132) receives a trigger to begin sending a media stream, here at faster than normal speed (e.g., 1⅓× or 2× normal speed), beginning in the capture buffer at a point indicated by the initiation command found during step 405. As previously discussed, even though the media stream is playing faster than normal, the audio signal may be processed so as to leave the voice pitch substantially unchanged.

During step 411 of FIG. 4, the terminal will check whether the stream controller 132 of FIG. 1 has caught up to the capture buffer 123, that is, whether the accumulated delay between the play out point for audio/video media data 131 and the current capture point for live audio and video from inputs 123, 124 remains less than or equal to a predetermined value (as described with respect to step 211, above).

As long stream controller 132 of FIG. 1 has not caught up to sufficiently reduce the accumulated delay during step 411, the process 400 continues during step 410 with stream controller 132 accessing and sending audio/video media data 131 at faster-than-real-time. Once the stream controller 132 of FIG. 1 has caught up to sufficiently reduce the accumulated delay, then processing proceeds to step 412, whereupon the stream controller 132 will access and stream audio/video media data 131 at normal speed, and as initiation process 400 concludes at step 413, the media stream continues to play at normal speed.

Figure 5:
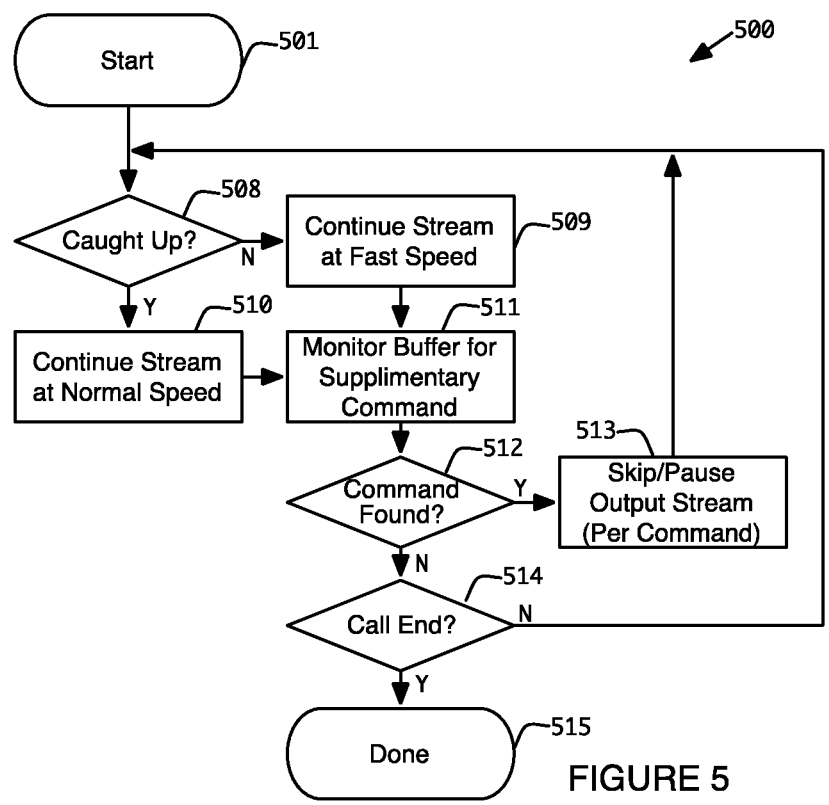
FIG. 5 depicts, in flowchart form, the steps of a second exemplary process executed by the system of FIG. 1 to provide improved call management following initiation, for example where the video stream undergoes separate enablement after the audio stream.

FIG. 5 shows a stream management process 500 for managing the stream after establishing a connection and sending at least a portion of the media stream. For example, the process 500 of FIG. 5 could manage the stream after call initiation using either of the call initiation processes 200 or 400 of FIGS. 2 and 4, respectively. In particular, the process 500 could manage an on-going media stream following call initiation by allowing or halting the video portion (i.e., the outgoing media might initially be audio only, and upon command, the video portion would engage), or the entire stream may pause, or the audio muted, and subsequently resume unmuted.

Process 500 begins upon commencement of step 501 with the stream already established, for example by using call initiation process 400 of FIG. 4. During step 508 of FIG. 5, the terminal determines whether the current position of the audio/video media data 131 of FIG. 1 being accessed by the stream controller 132 of FIG. 1 represents an accumulated delay less than a predetermined amount (e.g., 0-50 mS), representing a 'caught up' status. If so, then during step 510 the stream controller 132 continues play out at normal speed, but if not, then during step 509, the stream controller continues play out at a faster than normal speed (e.g., 1⅓× or 2× normal speed).

Regardless of the current play out speed, during step 511, the contents of capture buffer 125 of FIG. 1 undergo monitoring to detect a supplementary command recognized by the speech recognition module 126 of FIG. 1. During step 512, the terminal checks for receipt of such a command, and if so, the terminal then processes that command during step 513 (discussed below). If not, the terminal makes a determination during step 514 whether the call has ended, and if not, the process 500 reverts to step 508. The stream management process 500 concludes during step 515 when the call ends. When, at step 512, the speech recognition module detects a command for stream management, the terminal processes the command immediately during step 513 and thereafter, the stream management process 500 reverts to step 508.

As an example of a supplementary command, a local subscriber could direct his or her local terminal to start streaming video. In this regard, policy or system configuration considerations might dictate that a call is accepted in an audio-only mode. After call acceptance, the local subscriber might decide to provide a video stream. Under such circumstances, the local subscriber might utter the command "Computer, video on." for receipt at that subscriber's terminal (e.g., terminal 121 of FIG. 1). Here, "Computer," spoken in isolation, constitutes a "signal" word that precedes a command. Some speech recognition implementations or grammar approaches use this technique to both minimize ambiguity and to shorten the necessary search buffer (i.e., so the system only needs to search for the signal word in isolation, and then attempt to recognize a longer command only after finding the signal word, thereby consuming fewer computational resources). After recognizing the "video on" portion of the command, the terminal can activate the camera 124 and stream its video, when it becomes available, in sync with the audio already being streamed.

In some embodiments, the terminal may have already energized the camera 124 so the capture buffer 125 has already begun accumulating images from the camera in synchronism with the audio accumulated from the microphone 123, all of FIG. 1. However, until the terminal receives the command "video on", the stream controller 132 of FIG. 1 only transfers audio in the media stream 133. As soon as the terminal detects the "video on" command, the terminal can include video in media data 131 for transmission in the media stream 133. Note that, in cases where capture buffer 125 has media with an accumulated delay, the point in that data at which the terminal detects the "video on" command constitutes the same point at which that command should take effect. In other words, the "video on" command should not apply to video captured before detection of the command.

In some embodiments, the terminal will redact the act of the subscriber 122 giving such a command ("Computer, video on") from the media stream. In such a case, the remote subscriber 142, would remain unaware that the caller issued the command (other than because the mode of the call has changed to include the transmission of video). The redaction of the command occurs in the following manner. The terminal will choose a sufficiently long predetermined accumulated delay used as the target in step 508 for the signal word (e.g., "Computer") to undergo capture in buffer 125 and recognition by the speech module 126 (all of FIG. 1) before allowing access as the media data 131 by the stream controller 132. Thus, upon recognition of the signal word, sufficient time exists to pause the output stream, that is, to hold off releasing the captured utterance "Computer" to the stream controller 132. Once "paused" in this way, the process 500 can continue looping through step 508. However, when the steps 509 or 510 encounter the point where the media stream should pause, the stream will have a silent fill, instead of further media data. In the case of video, this silent fill could include a freeze frame (with or without fadeout), black, or an informative graphic (e.g., a graphic saying "one moment, please"), which could be animated. To the extent that the delay accumulated before recognition of the signal word in excess of the predetermined amount, playback of that portion of the stream can continue at normal speed (as during step 510) and need not occur at a faster speed during step 509 instead, depending upon the implementation.

While the stream remains paused at the point immediately preceding the signal word (or other recognized command), the capture buffer 125 accumulates the images from the camera 124 and audio microphone 123. If subsequent to the pause, the speech recognition module 126 does not recognize any command, then the stream becomes unpaused and access by stream controller 132 of FIG. 1 of the unstreamed portion of the media data 131 accumulated in capture buffer 125 will resume. The duration of the pause represents the amount by which the accumulated delay has grown, and as a result. the stream controller 132 may determine during step 508 of FIG. 5 that it must continue or resume play out at the faster speed, as during step 509.

Process 500 as described above uses the speed control paradigm as illustrated in process 400. In other words, if there excess delay has accumulated in the capture buffer, then the stream manager plays the media stream out at faster than normal speed to reduce the excess delay. Alternatively, a variation of the above described stream management process could use the "faster than normal, but only when silent" paradigm described with respect to the process 200 of FIG. 2.

In some cases, a terminal can excise (redact) all or part of a recognized command before streamlining the media data to a called party streamed. Generally, the grammar of the pattern for recognition will indicate the portion subject to redaction. For example, assume that the terminal wishes to redact the command, "Computer, video on" before reaching media stream 133. Such a command could have the following expression (in which curly-bracketed phrases are stream and call management instructions, unenclosed phrases are literal command phrases as might be spoken by a subscriber, and angle-bracketed phrases are tokens which are to be replaced, perhaps iteratively, until resolved to literal values):

{REDACT_S}<signal> VIDEO ON {REDACT_E} {VIDEO_ON} wherein the token <signal> constitutes the locally defined signal word (e.g., "Computer", though the subscriber could customize the signal word), and unenclosed phrase "VIDEO_ON" constitutes the specific command utterance.

In an alternative expression for the command, the command grammar uses the token <VIDEO_ON> instead of the literal (unenclosed) version of the command. The grammar would then include a collection of phrases corresponding to that command token. This allows the terminal to match this specific token with any utterance of "VIDEO ON", "TURN VIDEO ON", "ACTIVATE VIDEO", or "START VIDEO." The actual utterances acceptable in place of the command token can further depend on the spoken language preference of the subscriber. Thus, for a subscriber speaking German, the terminal would seek to recognize literal utterances such as "VIDEO AN" or "AKTIVIEREN VIDEO" for the <VIDEO ON> token. Grammar elements such as tokens that are satisfied by any one of one or more literal values, are well know.

To indicate that all or a portion of the spoken command requires redaction from the outbound stream, the command will include two redaction instructions {REDACT_S} and {REDACT_E}. These redaction instructions indicate that the portion of the utterance corresponding to those tokens and literals that lie between the start and end redaction tokens, requires redaction. The two redaction instructions always appear as a pair with a command form, and always in the start→end order, though some embodiments might choose to admit an unmatched instruction in a command form with the interpretation that if {REDACT_S} does not appear, the terminal will assume the presence of this redact operator at the beginning of the command or signal (if present). When {REDACT_E} does not appear, the terminal assumes the presence of such a redact operator at the end of the command (no such examples shown).

Under certain circumstances, a terminal could stream the uttered command to the remote station before the recognizing and parsing the utterance to place a {REDACT_S} in the stream. This could occur if the subscriber entering the command speaks slowly or the command phrase exceeds a prescribed length or that the accumulated delay and/or the station being commanded has a buffer latency too small. When this situation occurs, the {REDACT_S} can be placed at the current streaming position to execute immediately, unless this placement occurs after the {REDACT_E} instruction, in which case the instruction to redact cannot undergo execution.

Lastly, the {VIDEO_ON} instruction marks the point in the matched utterance at which the action triggered by the recognized command should take place. Thus, due to the redaction tokens, redaction of the entirety of the command utterance "Computer, video on" from the audio stream occurs, with the audio stream resuming following the placement of the {REDACT_E} instruction placed at the end of that portion of the utterance matching "ON". Coincident with the resumption of the audio stream, synchronized video may undergo streaming too, because of the placement of the {VIDEO_ON} instruction.

FIG. 6A illustrates a list 600 of exemplary call initiation commands 601-615 and FIG. 6B shows a list 620 of exemplary stream management commands 621-631. In each of the lists 600 and 620, the columns each list the following: (a) signal word (if any), (b) command (which may include words representing parameters and in some cases may be non-verbal), (c) suffix (when appropriate), (d) command type, and (e) command form for which the first three columns (signal, command, suffix) in each row contain an example utterance recognizable by the grammar in the command form column, with the suffix being part of a recognized utterance, but not part of the command. The command type constitutes a short description of what the command does.

Row 621 in FIG. 6B represents the "Computer, video on" command just discussed. The utterance "Computer" appears in the "signal" column. The "command" column will contain the command proper, "video on." In the case of this example, the command type constitutes "video activation" and the command form appears as given above.

Row 622 shows a command providing the same function, but because this command contains no signal word as part of the command form, the predetermined accumulated delay in the capture buffer must be sufficient to recognize the utterance "VIDEO ON" and still enable redaction of that utterance from the media stream. Here, the command has same the grammar as in Row 621, but without the <signal> token. If both commands 621 and 622 remain simultaneously available, then adequate buffering must exist for the longer of the two so that when the signal word of command 621 triggers recognition before recognition of command 622 starts, no ambiguity or race condition occurs. If the subscriber only uttered the words "VIDEO ON" with no signal word, then only command 622 will trigger. Commands 623 and 624 are analogous to commands 621 and 622, respectively, but deactivate the video.

Note that the instruction {VIDEO_ON} in commands 621 and 622 and the instruction {VIDEO_OFF} in the commands 623 and 624 could logically appear anywhere in the grammar associated with these commands, since everything else in the command gets redacted anyway, which would leave the start and end position of the command recognized as coincident in the resulting media stream 133 after redaction. This is not always the case, as will be discussed below with respect to certain commands (e.g., command 601).

Some commands 625-628 contain other stream control instructions, such as {MUTE} and {UNMUTE}. The redaction instruction not only prevents the stream from being heard, but also attempts to remove the redacted portion from the timeline. If sufficient delay has accumulated (particularly as might occur toward the beginning of a call), the stream recipient may not miss the redacted portion. The {MUTE} and {UNMUTE} instructions behave differently. They control audibility, but do not alter the timeline of the media stream. As an example, consider row 627, containing the command form grammar {MUTE} MUTE. The {MUTE} instruction in this command marks the point in the stream where suppression of the audio should start. The bare word "MUTE" constitutes the literal utterance that triggers the command. Since the {MUTE} instruction appears before the literal utterance, muting of the audio occurs before streaming the utterance. Were the command form to read MUTE {MUTE}, then the command would mute the audio of the stream following the streaming of the utterance, so the recipient would hear the audio cut out after hearing the word "mute", which some implementors may prefer. Note that, at least in English, the command "MUTE" constitutes a shorter utterance than "COMPUTER", and so no accumulated delay requirement exists for proper recognition of this command, even without a signal word in the grammar Note that the {MUTE} and {UNMUTE} instructions do not require pairing within a command (as do {REDACT_S} and {REDACT_E}), though they could be, and that they need not be paired in separate commands: A subscriber might command the system to mute, and a few moments or minutes later, either forgetting himself or herself or just for extra assurance, could command the system to mute again.

In FIG. 6A, the {BUFFER} token constitutes a type of stream instruction that can appear in both the call initiation and the calls acceptance commands 601-610 and 614-615. Since these initiation and call acceptance commands result in the start of a media stream, the {BUFFER} instruction serves to indicate where the newly initiated stream should begin within the buffer. Upon recognition of one of the call initiation commands (e.g., commands 601-606, and 614), the {BUFFER} instruction triggers the start of accumulated delay. The {INIT} instruction indicates the point at which enough information has gathered in the buffer to allow the terminal to attempt call initiation. Further, {INIT} instruction can define the command as a call initiation type.

Upon receipt of an inbound call and subsequent recognition of a call acceptance command (e.g., commands 607-610, 615), the {BUFFER} instruction triggers the start of accumulated delay. The {ACCEPT} instruction represents the point at which to start a connection and defines the command as a call acceptance type command. In both cases, the speech recognition module 126 of FIG. 1 instructs the stream controller 132 where in the capture buffer 125 the audio/video media data 131 should begin, based having encountered the {BUFFER} instruction in a command form. In other embodiments, where the system 100 does not expect the remote party to hear a command to initiate or accept a call, the command need not include the {BUFFER} instruction, but a terminal will treat such commands as having the {BUFFER} instruction at the end of the command. In still other embodiments, where the subscriber should always hear a command to accept or initiate a call, policy presumes that the {BUFFER} instruction occurs at the start of the command (before or after any signal word, depending upon policy). In these examples (e.g., for commands 601-610, 614-615), the placement of the {BUFFER} instruction results in the recognized command (when verbal), but not any signal words, being streamed and heard by the remote participant.

In the exemplary commands appearing in rows 601-610, the elements such as <self_ref>, <station_ref>, and <addressee_ref> are tokens that also each represent a parameter in the grammar. For example, in row 601, the token <self_ref> represents an utterance by subscriber 122 initiating a call in his or her name, in this case, the literal utterance "Kirk". Some systems might interpret this element as requiring a subscriber to identify him or her to the system in order for recognition of the command. In alternative embodiments, the grammar constraints might allow any brief utterance that appears between the signal word and the literal "TO".

In the same example, <station_ref> token represents that an utterance must match a station known to the system, such as contained in a local address file (not shown) or found in the presence database 112 of FIG. 1. This parameter determines the remote station to be called by the local station. In example 603, the <addressee_ref> token represents a particular subscriber, rather than a station, but would otherwise get resolved in the same way as <station_ref>.

With regard to the commands 608-610, each command form contains grammar that recognizes a single occurrence of several different greetings. In example 608, these greetings include the literals "HERE", "AYE", "HELLO" separated by the vertical bar character, whereas for the command 609, such greeting words (and others) are represented by the single <familiar_greeting> token. Such a construct allows for easier construction and maintenance of command grammars. For example, upon adding the word "HEY" as a literal corresponding to the <familiar_greeting> token provides that the word will now apply to all instances of the collective token, as in command 610. Otherwise, a need would exist to add the word to all the individual instances of the command form (e.g., as another alternative literal in command 608), making tracking necessary to ensure consistency, which could prove awkward. The literal construct further offers the advantage of possibly covering different languages by collecting the various greeting words under the <familiar_greeting> element and allowing modification thereof by an explicit or default language selection (not shown).

In other examples, e.g., rows 630 and 631 in table 620, the system 100 of FIG. could generate a call-waiting signal (not shown) to let a subscriber know that another call is waiting. The call waiting signal could be ignored by the subscriber. Alternatively, the subscriber could accept the new incoming call as a second call, using the "switch call" command type. After the subscriber accepted the second call, the subscriber could later terminate second call and resume the first call using the "resume call" command type.

In the former case, when a new incoming call awaits acceptance, and the terminal now recognizes the "switch call" command from the local subscriber (e.g., command 630), a new outbound stream can begin at the point indicated by the {BUFFER} instruction. In this example, the {BUFFER} instruction appears after the "switch command" token (matched by the literal utterance "Switch Calls"). Therefore, the command utterance "Switch Calls" made by the local subscriber does not become part of the media stream sent to and heard by the remote subscriber who initiated the second call. The remote subscriber who initiated the first call will also not hear this command utterance because of the {MUTE} instruction. The start of the second call and placement of the first call on hold both occur in response to the {ACCEPT} instruction.

While the first call remains on hold, the mute may remain in effect, or the system could choose to provide another effect (e.g., "music on hold" or a visual notification) while the hold persists. Upon acceptance, the second call does not undergo muting because the {MUTE} instruction only applies to the call that was active at the time of encountering that instruction.

In the latter case, upon termination of the second call to return to the first call, the {MUTE} instruction prevents the second caller from hearing the resume call command and the {RESUME} instruction marks the point of termination of the second stream and release of the first stream from hold. Assigning the stream to take up at the {BUFFER} instruction can eliminate any accumulated delay remaining for this first stream. The {UNMUTE} instruction applies to the now currently active first stream, which had undergone muting in response to the "switch call" command 630. For other variations of the "resume call" command, the {MUTE} instruction might be absent, in which case the second caller would hear the utterance of the "Resume Call" command. Further, if the {BUFFER} instruction appeared at the start of the command, the first caller could hear the same utterance, though the accumulated delay for that stream would be set to at least the entire command utterance.

For cases in which the subscriber wants to actively reject an inbound call, the subscriber can do so using one of the exemplary call denial commands shown in rows 611-612, whereas row 613 depicts a passive denial command. The {DECLINE} instruction indicates that the command will block a connection to the inbound call, thereby refusing the call. As is common in many grammars, the notation in rows 611 and 612 separates multiple alternative literals, any one of which will match (i.e., any one of the utterances "Cancel", "Block", "Deny" would match the grammar). Whether any certain words have a further connotation e.g., whether the word "Block" would implicitly result in a terminal ignoring future calls from the same caller remains a design choice available to different implementations. The command grammar could support additional instruction like {BLACKLIST} (not shown in FIG. 6A) following the literal "BLOCK" to explicitly associate such functionality with that specific word in such a context, but not with the other choices, such as "CANCEL" and "DENY".

In some cases, for example to simplify the task of speech recognition for the call initiation or call acceptance commands, the structure of the command can include a signal word, for example "Computer", as in "Computer: Kirk to Engineering" where the signal word would not comprise part of the stream, but "Kirk to Engineering" would. In this case, the stream would begin just after the signal word, but still within the interval of the command utterance. Row 601 depicts such an example. In some instances, an utterance can contain an explicit or implied dialing command, immediately followed by a portion of the conversation, as in "Mr. Scott, meet me on the bridge." Here, the capture buffer in the terminal would buffer the entirety of the utterance, even though only the first portion corresponds to a command to initiate a connection. Row 606 shows such an example.

In a video call, the called party may first accept the call with a verbal response (e.g., "Here, Sir", as depicted in row 608), but the system configuration may only allow connection of the audio stream at first. To activate the video portion of the media stream, the subscriber would utter a subsequent command, "Video on" (as depicted in row 622). The terminal could squelch that utterance in the return stream (depending upon configuration or preferences), including removing the duration of the command utterance from the timeline when possible, after which the terminal will activate the video portion of the media stream.

In other embodiments, instead of the terminal streaming the audio/video media data at faster-than-real-time, the terminal could skip portions of the stream (not shown). In such an implementation, skipping only silent sections of the audio/video media data becomes preferable. In this regard, the terminal could crossfade between the last fraction of a second before the skipped portion and the first fraction of a second following the skipped portion.

Figure 7:
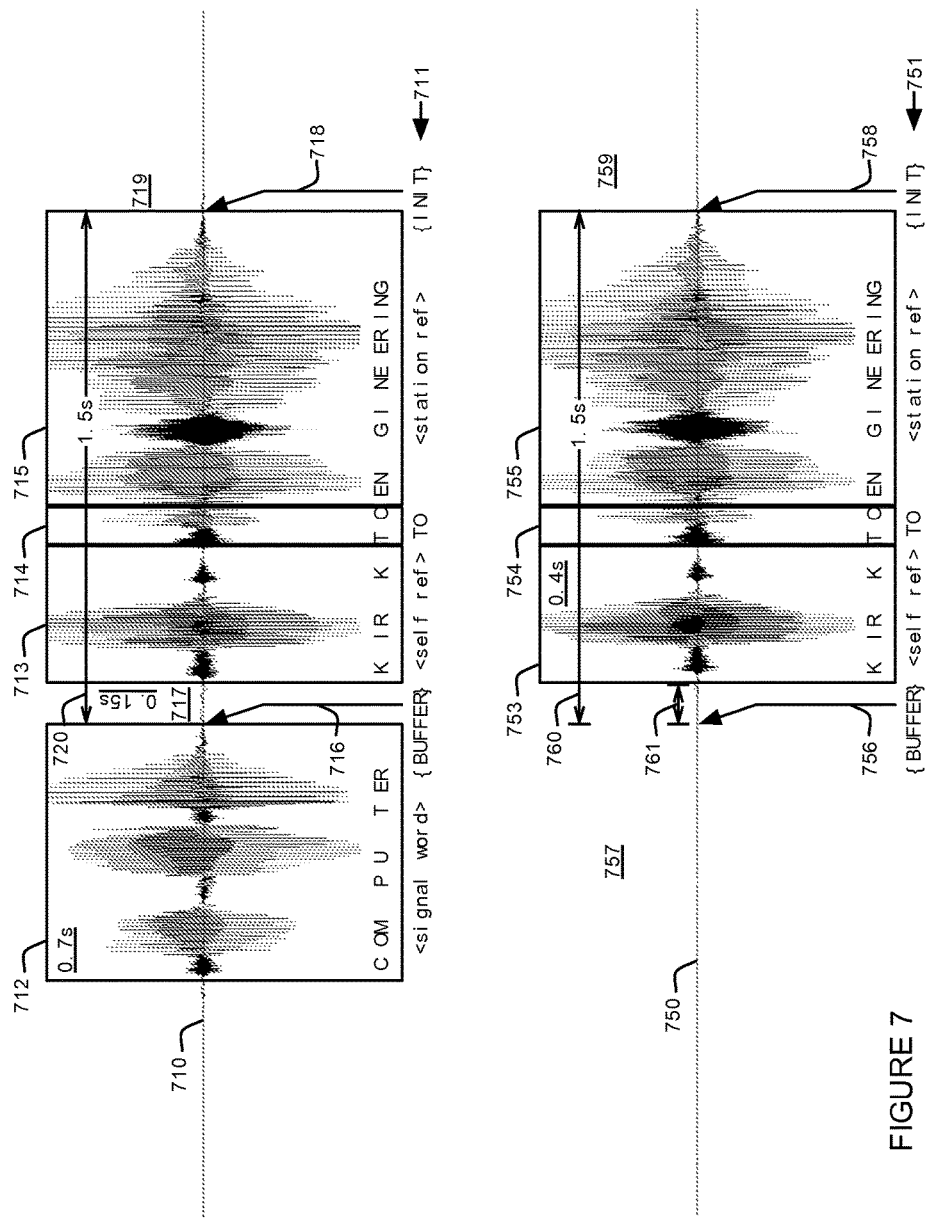

FIG. 7 depicts graphical representations of two exemplary audio input signals representing two utterances and the manner in which these utterances map to elements and tokens of corresponding command forms. The audio input signal 710 contains the utterance "Computer: Kirk to Engineering" which fulfills the grammar of command form 711 (the same as for row 601 of FIG. 6). The first portion 712 of the audio input signal 710 has a duration 0.7 seconds long and contains the spoken word "Computer", which matches the <signal word> token, that is, where at least one acceptable signal word for the exemplary grammar is the literal "computer". A short (0.15 s), but substantially silent, gap 717 exists in this exemplary utterance, followed by three recognized words, one in each of the second portion 713 ("Kirk"), third portion 714 ("to") and fourth portion 715 ("Engineering"), followed by the extended silence 719. The second portion 713 matches the <self_ref> token of command form 711. The third portion 714 matches the literal "TO", and the fourth portion 715 matches the <station_ref> token, assuming that an entry exists in the database 112 for a station named "Engineering". Upon recognition of all the elements of the command form 711, the effect of the tokens becomes definite. The {BUFFER} instruction, coming after the <signal word> token, becomes set by the terminal to location 716, immediately following the first portion 712 of audio input signal 710, and this is the point at which streaming will begin when started. The {INIT} instruction becomes associated with the position 718 in the audio input signal 710, and this point can serve as the start of the stream in cases in the absence of providing any {BUFFER} instruction. The {INIT} instruction also indicates that the function of call initiation has begun upon recognition of the command, but for that, the position 718 otherwise has no pertinence.

Thus, audio input signal 710 matches the command form 711 (and row 601 of FIG. 1) and will initiate a call to the station identified as "Engineering", with the outgoing stream 133 comprising audio/visual media data 131 beginning at the position 716 in the audio input signal 710 acquired by capture buffer 125 of FIG. 1. The terminal will not stream the first portion 712 of 0.7 s in duration. Further, the 1.5 s duration 720 of gap 717 and portions 713-715 represent a minimum possible accumulated delay (like duration 342 of FIG. 3), where the actual accumulated delay would additionally include the address recognition latency 344, and the time required to conduct the SIP transactions (transactions 345, 346, 347, and 349) through to the caller stream initiation event 350.

The audio input 750 signal contains the utterance "Kirk to Engineering", without any signal word, which does not fulfill the grammar for the command form 711 (which requires the signal word), but does fulfill the grammar for the command form 751 (and row 602 of table 600). The audio input signal 750 begins with an extended silence 757, which gets broken by the first portion 753 containing the 0.4 s long utterance "Kirk" which constitutes an acceptable match for the <self_ref> token of form 751. The second portion 754 contains the spoken word "to" which matches the literal "TO" of form 751 and third portion 755 contains the spoken word "Engineering" which corresponds to the <station_ref> token of 751 as above (assuming "Engineering" constitutes a currently recognized station name). In this example, the {BUFFER} instruction appears first, just ahead of the <self_ref> token. As such, for some embodiments, the buffer position could be determined to be the start of first portion 753, which corresponded to the <self_ref> element, but such an assignment can frequently cause a click or pop at the start of the buffer, since there could exist some aesthetically desirable pre-utterance that precedes the portion 753 identified by speech recognition module 126 of FIG. 1. However, in this embodiment, the terminal selects the buffer position 756 before the start of first portion 753 by an offset 761, which comprise a predetermined value, e.g., 150 mS. The position 758 of the {INIT} instruction in audio input 750 is similar to that above for audio input 710.

Thus, audio input signal 750 matches the command form 751 (and row 602 of FIG. 6) and will initiate a call to the station identified as "Engineering," with the outgoing stream 133 comprising the audio/visual media data 131 beginning at the position 756 in the audio input 750 signal acquired by the capture buffer 125 of FIG. 1. The stream will not include the silence 757 stream except for the interval 761 (if any) immediately before the portion 753. The 1.5 s aggregated duration 760 of the interval 761 and the portions 753-755 represent a minimum possible accumulated delay (like the duration 342 of FIG. 3), which would additionally include the address recognition latency 344, the time required to conduct the SIP transactions (e.g., transactions 345, 346, 347, and 349) through to caller stream initiation 350.

The foregoing describes a technique for managing both audio-only and audio-video calls.

The invention claimed is:

1. A method for establishing a call from a caller to a called party, comprising the steps of:
   storing, in a buffer of a controller, a media stream, including a voice command, received from the caller;
   initiating, by the controller, the call from the caller to the called party in accordance with the voice command; and
   transmitting the media stream including the voice command from the buffer to the called party following setup of the call, wherein the transmitting has an accumulated delay that is initially at least a duration of the voice command plus an address recognition latency of the determining plus a duration of the initiating, and wherein the transmitting step includes the steps of:
   (a) monitoring the media stream for a silence interval;
   (b) omitting the silence interval of the media stream from transmission; and
   (c) transmitting intervals of the media stream other than the silence interval at normal speed; and wherein the steps of (a) and (b) are repeated for each subsequent silence interval to reduce the accumulated delay in the media stream below a predetermined value.

2. The method according to claim 1 wherein the step of transmitting the media stream includes transmitting the media stream at faster than real time until the accumulated delay is reduced below the predetermined value.

3. The method according to claim 1 wherein the step of initiating the call includes sending an SIP INVITE message.

4. The method according to claim 1 wherein the media stream further includes video.

5. A method for initiating a call between a caller and a called party, comprising:
   storing, in a buffer of a controller, a media stream received from a first participant that is one of the caller and the called party, the media stream including a voice command;
   initiating the call, by the controller, in accordance with the voice command as recognized by a speech recognition module of the controller; and,
   transmitting the media stream, including the voice command, from the buffer to a second participant that is another one of the caller and the called party; wherein transmitting the media stream initially incorporates an accumulated delay of at least a duration of the voice command; and wherein the transmitting step includes:
   (a) monitoring the media stream for a silence interval;
   (b) omitting the silence interval of the media stream from transmission; and
   (c) transmitting intervals of the media stream other than the silence interval at normal speed;

wherein the steps of (a) and (b) are repeated for each subsequent silence interval to reduce accumulated delay in the media stream below a predetermined value.

6. The method according to claim 5 wherein the step of transmitting the media stream includes transmitting the media stream at faster than normal speed until the accumulated delay is reduced below the predetermined value.

7. The method according to claim 5 wherein the step of launching the call includes sending an SIP INVITE message.

8. The method of claim 5 wherein the first participant is the caller and the address for a station of the second participant is determined from the voice command.

9. The method of claim 5 wherein the first participant is the called party and the voice command indicates acceptance of the call.

* * * * *